United States Patent
Morton et al.

[15] 3,689,818
[45] Sept. 5, 1972

[54] CONTROL MEANS FOR ELECTRIC MOTORS OPERATED FROM BATTERIES

[72] Inventors: John Morton, Gazel Grove; Keith Drummond Stevens, Marple; Graham Spencer Thexton, Marple Bridge, all of England

[73] Assignee: Cableform Limited, Cheshire, England

[22] Filed: Feb. 16, 1971

[21] Appl. No.: 115,534

[30] Foreign Application Priority Data

Feb. 17, 1970 Great Britain.............7473/70

[52] U.S. Cl..................................318/478, 318/341
[51] Int. Cl................................................H02p 1/44
[58] Field of Search.......318/478, 246, 251, 139, 341

[56] References Cited

UNITED STATES PATENTS

| | | |
|---|---|---|
| 3,349,309 | 10/1967 | Dannettell.................318/341 |
| 3,360,705 | 12/1967 | Morris....................318/251 X |
| 3,411,065 | 11/1968 | Tedd.........................318/341 |
| 3,517,290 | 6/1970 | Gunsser................318/341 X |
| 3,562,617 | 2/1971 | Meier........................318/341 |

*Primary Examiner*—Benjamin Dobeck
*Attorney*—Holman & Stern

[57] ABSTRACT

In, for example, battery operated vehicles such as fork lift trucks, the electric motor is supplied with pulses of current from a D.C. switch comprising thyristors. If spurious signals get into the control circuit the vehicle may take off out of control. The invention provides a control circuit in which the pulses of current through the D.C. switch are compared with the control signal pulses and in which the D.C. switch is disabled if there is a current signal in the absence of a control signal.

7 Claims, 1 Drawing Figure

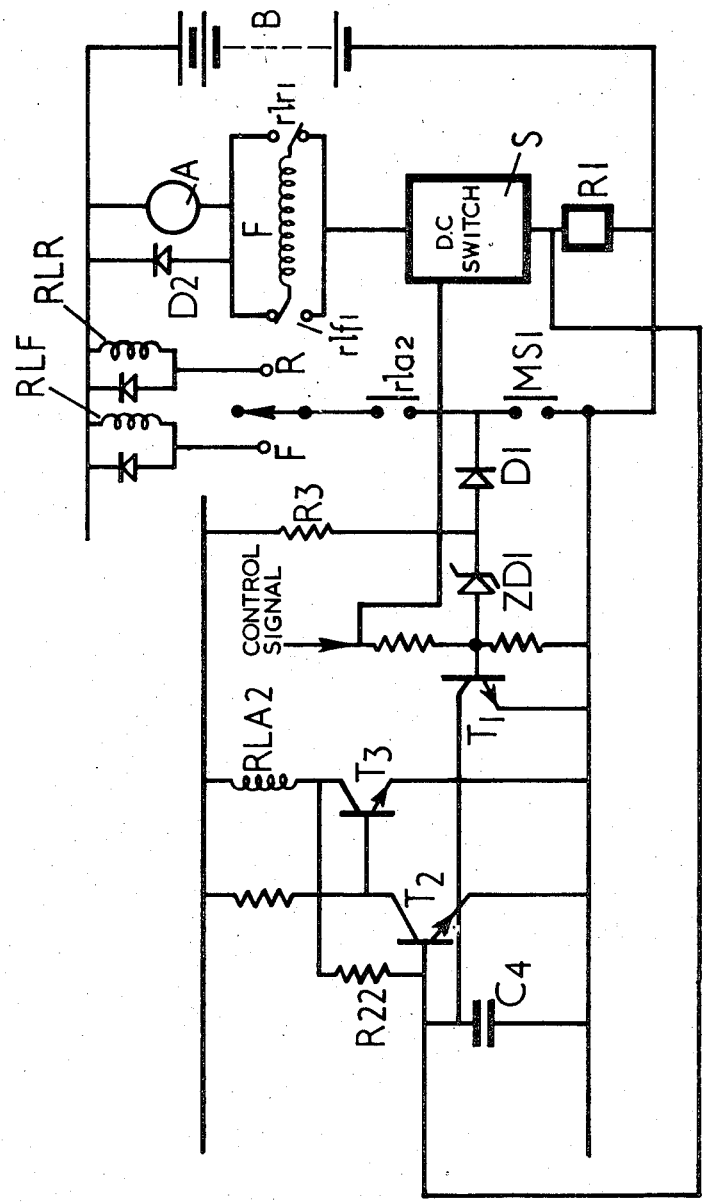

CONTROL MEANS FOR ELECTRIC MOTORS OPERATED FROM BATTERIES

This invention relates to control means for electric motors operated from batteries, such for example as are used in battery operated vehicles.

It is known to control the speed of an electric motor by controlling the supply of energy from a battery to a motor by means of a D.C. switch. Such switches usually comprise a thyristor switch arrangement which is switched on and off by a pulse generator having a mark-space ratio of the pulses which is proportional to an input control signal, for example obtained from a speed control pedal of a vehicle driven by the motor.

If for any reason, such as unwanted interference signals or malfunction of the control circuits, the thyristor switch arrangement receives unwanted pulses it is possible that, for example, a vehicle would move out of control of the driver and become dangerous.

It is an object of the present invention to provide means which detect such an unwanted condition and disables the switching arrangement.

According to the invention, a control means for a battery operated electric motor, comprises a D.C. switch arrangement for controlling the supply of current pulses from a battery to an electric motor, means for obtaining a current signal when current flows from the battery through the switch arrangement, means for comparing the current signal with the control pulse signal to the D.C. switch arrangement and means for disabling the D.C. switch arrangement if there is a current signal in the absence of a control signal.

Conveniently, the disabling is brought about by opening contacts in an interlock circuit of a change-over contactor in the motor circuit.

An embodiment of the invention will now be described, by way of example, with reference to the accompanying drawing which is a schematic circuit diagram.

A motor comprising an armature A and a reversible field F is supplied with current from a battery B via a D.C. switch S, which comprises a thyristor arrangement providing pulses of current of frequency and duration controlled by a control signal. A forward/reverse switch FR controls contactors RLF and RLR which together have contacts $rlf1$ and $rlr1$ for reversing the field F. Across the motor armature there is a diode D2 to allow circulation of armature current during the interpulse periods. Inserted in the circuit between the battery B and the D.C. switch S is a small resistance R1 from which is obtained a signal when current is flowing from the battery. This current signal is fed to the base of a transistor $T_2$ which switches on unless inhibited by a transistor $T_1$. A transistor $T_3$ which is normally switched-on, has a relay RLA2 in its collector circuit, the contacts $rla2$ of which are included in an interlock circuit to the reversing contactor FR. If transistor $T_2$ becomes conductive transistor $T_3$ is switched-off, relay RLA2 is released and contacts $rla2$ open thus tripping the interlock circuit and preventing operation of the motor. Also the rise in the collector voltage of transistor $T_3$ causes a voltage to be applied to the base of transistor $T_2$ via a resistor R22 which locks-on transistor $T_2$.

However, in normal operation, conduction of transistor $T_2$ is inhibited by transistor $T_1$ which has fed to its base circuit the input control pulses which are also fed to the D.C. switch S. As long as there are control pulses being fed to transistor $T_1$, transistor $T_2$ is held non-conductive. If a current signal is present at switch S in the absence of a control signal then transistor $T_2$ becomes conductive and the tripping sequence occurs.

Once tripping has occurred transistor $T_2$ is locked-on it can be released only be opening a microswitch MS1 which is included in the interlock circuit and forms part of a foot pedal speed control for a vehicle. Opening microswitch MS1 enables a large voltage to be applied via resistor R3 and Zener diode ZD1 to transistor $T_1$ to discharge a capacitor C4 which has become charged through resistor R22. The circuit can then operate in the normal manner. Capacitor C4 is chosen to give sufficient time delay to cover the time for charging the commutating capacitor in the D.C. switch S and any other slight differences in the occurences in the pulses.

What is claimed is:

1. A control means for a battery operated electric motor, comprising a D.C. switch arrangement for controlling the supply of current pulses from a battery to an electric motor, means for obtaining a current signal when current flows from the battery through the switch arrangement, means for comparing and determining concurrence of the current signal with the control pulse signal to the D.C. switch arrangement and means for disabling the D.C. switch arrangement if said comparing means determines there is a current signal in the absence of a control signal.

2. A control means for a battery operated electric motor, comprising a D.C. switch arrangement for controlling the supply of current pulses from a battery to an electric motor, means for obtaining a current signal when current flows from the battery through the switch arrangement, means for comparing the current signal with the control pulse signal to the D.C. switch arrangement and means for disabling the D.C. switch arrangement if there is a current signal in the absence of a control signal, and wherein the motor has a reversible field switched by a forward/reverse contactor and said disabling is brought about by opening contacts in the energization circuit to the contactor.

3. Means as claimed in claim 2, wherein once the D.C. switch arrangement is disabled it remains disabled until a manual operation is performed to release it.

4. Means as claimed in claim 1, wherein the current signal is applied to the base of a first transistor which is inhibited by a second transistor during the existence of a control pulse signal at its base.

5. A control means for a battery operated electric motor, comprising a D.C. switch arrangement for controlling the supply of current pulses from a battery to an electric motor, means for obtaining a current signal when current flows from the battery through the switch arrangement, means for comparing the current signal with the control pulse signal to the D.C. switch arrangement and means for disabling the D.C. switch arrangement if there is a current signal in the absence of a control signal, wherein the current signal is applied to the base of a first transistor which is inhibited by a second transistor during the existence of a control pulse signal at its base, and wherein the collector of said first transistor is connected to the base of a third transistor which is conductive while the first transistor is inhibited and which has a relay in its output circuit, contacts of the relay operating to disable the D.C. switch when open.

6. Means as claimed in claim 5, wherein the output of the third transistor is connected back to the base of the first transistor so that when conduction of the third transistor ceases due to conduction of the first transistor the first transistor is locked-on conductive and can be released only by a manual operation.

7. A control means for a battery operated electric motor, comprising a D.C. switch arrangement for controlling the supply of current pulses from a battery to an electric motor, means for obtaining a current signal when current flows from the battery through the switch arrangement, means for comparing the current signal with the control pulse signal to the D.C. switch arrangement and means for disabling the D.C. switch arrangement if there is a current signal in the absence of a control signal, wherein the current signal is applied to the base of a first transistor which is inhibited by a second transistor during the existence of a control pulse signal at its base, and wherein a capacitor is connected across the base input to the first transistor to provide a time delay sufficient to cover the time of charging of a cummutating capacitor associated with the thyristors in the D.C. switch arrangement.

* * * * *